United States Patent
McDonald et al.

(10) Patent No.: US 7,299,336 B2
(45) Date of Patent: Nov. 20, 2007

(54) SCALING ADDRESS SPACE UTILIZATION IN A MULTI-THREADED, MULTI-PROCESSOR COMPUTER

(75) Inventors: Christopher F. McDonald, Austin, TX (US); Bruce Mealey, Austin, TX (US); Mark Douglass Rogers, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 10/920,910

(22) Filed: Aug. 18, 2004

(65) Prior Publication Data

US 2006/0053267 A1   Mar. 9, 2006

(51) Int. Cl.
  G06F 9/26 (2006.01)
  G06F 9/34 (2006.01)
  G06F 12/00 (2006.01)
(52) U.S. Cl. .................. 711/206; 718/104; 719/312
(58) Field of Classification Search ............. 711/206; 718/104; 719/312
  See application file for complete search history.

(56) References Cited

U.S. PATENT DOCUMENTS 5,632,032 A   5/1997   Ault et al.
5,652,885 A * 7/1997   Reed et al. .................... 713/1
2003/0088604 A1* 5/2003 Kuck et al. .................... 709/1
2004/0107419 A1* 6/2004 Blackmore et al. ......... 718/100
2004/0162952 A1* 8/2004 Feind et al. ................ 711/147
2005/0268047 A1* 12/2005 Aslot et al. ................ 711/147

OTHER PUBLICATIONS

U.S. Appl. No. 08/733,997, filed Oct. 29, 1996, Ault et al.
U.S. Appl. No. 10/682,409, filed Oct. 9, 2003, Loafman.
U.S. Appl. No. 10/670,833, filed Sep. 25, 2003, Aguilar et al.
Carter et al.; Object Access Method Enablement of DB2 Thread Restrictive; Nov. 1993; pp. 495-496; TDB vol. 36 n11; US.
Rosenburg; Low-Synchronization Translation Lookaside Buffer Consistency Algorithm; Nov. 1990; pp. 428-433; TDB n6b; US.

* cited by examiner

*Primary Examiner*—Matthew Kim
*Assistant Examiner*—Edward J Dudek
(74) *Attorney, Agent, or Firm*—John Biggers; Michael S. Walker; Biggers & Ohanian, LLP

(57) ABSTRACT

Scaling address space utilization in a multi-threaded, multi-processor computer, including attaching to process memory of an exporting process a region of virtual memory specified in a cross-memory descriptor; requesting, by an importing thread of an importing process having process memory, a lightweight attachment of the region of virtual memory to the process memory of the importing process for exclusive use by the importing thread; and lightweight attaching, by an operating system to the process memory of the importing process, the region of virtual memory for exclusive use by the importing thread.

21 Claims, 8 Drawing Sheets

Cross-Mem Descriptor ~ 326 descriptorID ~ 104
regionAddress ~ 106
regionSize ~ 108
expProcID ~ 110
expProcMemAddr ~ 112
impProcID ~ 114
impThreadID ~ 116
impProcMemAddr ~ 118

SCALING ADDRESS SPACE UTILIZATION IN A MULTI-THREADED, MULTI-PROCESSOR COMPUTER

BACKGROUND OF THE INVENTION

1. Field of the Invention

The field of the invention is data processing, or, more specifically, methods, systems, and products for scaling address space utilization in a multi-threaded, multi-processor computer.

2. Description of Related Art

A 'translation' is a mapping from a segment in a process address space to a segment in virtual address space. Translations are cached for high-speed access in Segment Lookaside Buffers ('SLBs'). Each processor in a multi-processor computer system typically has an SLB for use in translating memory references from process address space to virtual address space.

It is common for one thread of a multi-threaded process or application to remove addressability to a particular area of memory for the whole process. One thread will attach a region of virtual memory to the process address space, read and/or write, and then that thread or another thread will detach the region. On a multiprocessor system this presents a problem, because another thread of the same process currently running on some other processor at the time of the detachment may have a local mapping in its SLB to that region of virtual memory. The translation in the detaching processor's SLB and its corresponding global translation in a main segment map or segment table maintained by the operating system are both removed by the detachment, but the translation in the other processor's SLB is not removed by the detachment. So the thread running on that other processor can still attempt to reference this now detached area of memory. In effect, the translation in the other processor's SLB has become invalid or 'stale' without the other processor's being informed of the invalidity. Processing errors will result if this other processor references a memory segment mapped through such a stale translation.

An existing solution for this problem is to send a message to every other processor on the system before completing a cross-memory detachment. Such a message tells each processor on the system to reset its SLB and send a message back to the detaching processor when it has finished. When all processors have acknowledged that they have reset their SLBs, the detachment is allowed to complete. Now no threads can have stale translations to the detached virtual memory region.

The problem with this solution is that it has a substantial performance impact, especially on systems with many processors. If one processor does a detach, every other processor, even if it is running a totally unrelated job, must stop what it is doing, reset its SLB, and respond. When the other processors resume operation, they must reload their SLBs with any valid translations that were wiped out, translations that are still represented by entries in the operating system's segment table for the process. This problem only gets worse as the number of processors increases, because the chance that any one processor is doing a detachment at any given time increases with the number of processors. There is an ongoing need therefore, for improvement in the administration of address space in multi-threaded, multi-processor computer systems.

SUMMARY OF THE INVENTION

Methods, systems, and products are disclosed for scaling address space utilization in a multi-threaded, multi-processor computer, including attaching to process memory of an exporting process a region of virtual memory specified in a cross-memory descriptor; requesting, by an importing thread of an importing process having process memory, a lightweight attachment of the region of virtual memory to the process memory of the importing process for exclusive use by the importing thread; and lightweight attaching, by an operating system to the process memory of the importing process, the region of virtual memory for exclusive use by the importing thread. Typical embodiments also include registering by the importing process with the operating system for lightweight attachment of virtual memory to process memory of the importing process for exclusive use by threads of the importing process, including advising the operating system of a maximum pool size of process memory of the importing process to be reserved for each thread of the importing process that requests such a lightweight attachment.

In typical embodiments, lightweight attaching the region of virtual memory also includes lightweight attaching the region of virtual memory from a pool of process memory of the importing process reserved for lightweight attachments for the importing thread. In typical embodiments, lightweight attaching the region of virtual memory to the process memory of the importing process also includes lightweight attaching the region of virtual memory to the process memory of the importing process without resetting segment lookaside buffers if the requested region of virtual memory is smaller than a quantity of process memory available from a pool of process memory of the importing process reserved for lightweight attachments for the importing thread. In typical embodiments, lightweight attaching the region of virtual memory to the process memory of the importing process also includes lightweight attaching the region of virtual memory to the process memory of the importing process only after resetting segment lookaside buffers if the requested region of virtual memory is larger than a quantity of process memory available from a pool of process memory of the importing process reserved for lightweight attachments for the importing thread.

Typical embodiments also include requesting, by the importing thread, lightweight detachment of the region of virtual memory from the process memory of the importing process; lightweight detaching, by the operating system, the region of virtual memory from the process memory of the importing process, including resetting only the segment lookaside buffer of the processor upon which the importing thread runs without resetting other segment lookaside buffers of other processors. Typical embodiments also include detaching the attachment to the process memory of the exporting process, including determining that all lightweight attachments to the region of virtual memory have been detached; comparing a time of the last lightweight detachment from the region of virtual memory to the time of the last address space switch on each processor in the computer; and detaching the region of virtual memory from the process memory of the exporting process if the time of the last lightweight detachment from the region of virtual memory is earlier than the time of the last address space switch on each processor in the computer.

Typical embodiments also include repeating periodically for a predetermined period of time the steps of comparing a time of the last lightweight detachment from the region of virtual memory to the time of the last address space switch on each processor in the computer and detaching the region of virtual memory from the process memory of the exporting process if the time of the last lightweight detachment from the region of virtual memory is earlier than the time of the last address space switch on each processor in the computer; and if the predetermined period of time expires before the time of the last lightweight detachment from the region of virtual memory is earlier than the time of the last address space switch on each processor in the computer including resetting all segment lookaside buffers of all processors in the computer and detaching the region of virtual memory from the process memory of the exporting process.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for scaling address space utilization in a multi-threaded, multi-processor computer. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Figure 1:
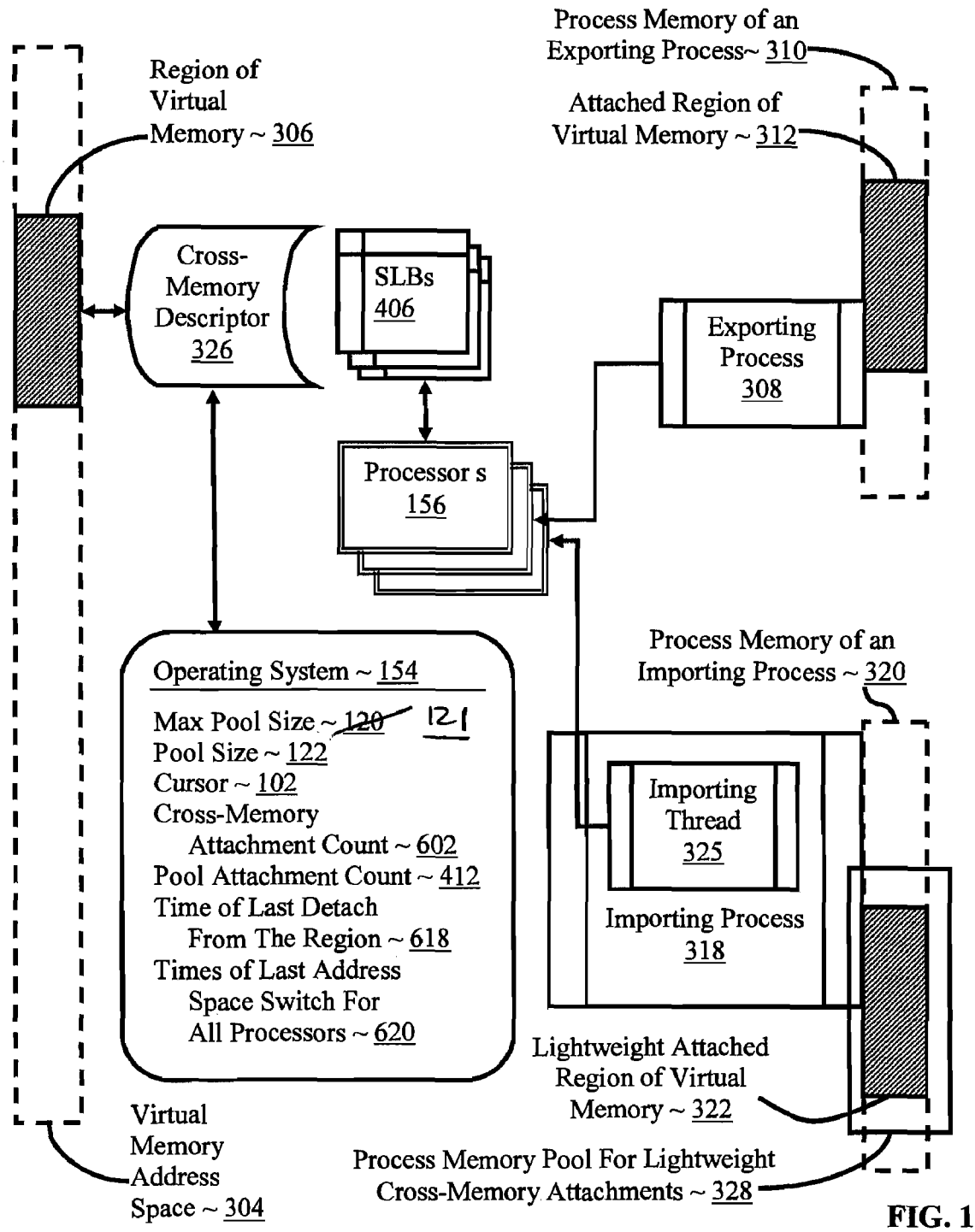
FIG. 1 sets forth a block diagram of an exemplary system for scaling address space utilization in a multi-threaded, multi-processor computer.

For Scaling Address Space Utilization In A Multi-Threaded, Multi-Processor Computer Exemplary methods, systems, and computer program products for scaling address space utilization in a multi-threaded, multi-processor computer according to embodiments of the present invention are described with respect to the accompanying drawings, beginning with FIG. 1. FIG. 1 sets forth a block diagram of an exemplary system for scaling address space utilization in a multi-threaded, multi-processor computer according to embodiments of the present invention. The example of FIG. 1 includes a virtual memory address space that is used to organize memory for the entire system. The virtual memory address space (304) bears an identified region of virtual memory for cross-memory attachment. The region of virtual memory identified for cross-memory attachment is specified in a data structure called a cross-memory descriptor (326). A cross-memory descriptor (326) is described in more detail below with reference to FIGS. 1A and 1B.

In the system of FIG. 1, exporting process (308) has in its process memory (310) a segment (312) of memory that is attached cross-memory to the identified region (306) of virtual memory. In this specification generally, attachments of process memory to the region of virtual memory specified for such attachments through a cross-memory descriptor are often referred to as 'cross-memory attachments,' and a process of creating such an attachment is often referred to according to context as 'cross-memory attaching' or 'attaching cross-memory.'

In the example of FIG. 1, importing process (318) has in its process memory (320) a segment (322) of memory that is lightweight attached cross-memory to the identified region (306) of virtual memory. The term 'lightweight' is used to describe the cross-memory attachment to the process memory (320) of the importing process (318) because the lightweight cross-memory attachment is for the exclusive use of a single thread of the importing process and because in many circumstances the lightweight attachment can be 'lightweight detached,' that is, detached with no need to incur the slow, burdensome processing costs of resetting all the SLBs in the system. In this specification generally for clarity of explanation, attachments of memory for the exclusive use of a thread of an importing process are referred to as 'lightweight attachments,' and a process of creating such an attachment is referred to as 'lightweight attaching.'

In this specification, an 'exporting process' is a process that makes a region of virtual memory, mapped to a portion of its process memory, available for cross-memory attachments by creating a cross-memory descriptor. Multiple importing processes may effect lightweight cross-memory attachments to the region of virtual memory. All such lightweight cross-memory attachments to importing process memory must be detached before the exporting process can detach its attachment (312) and release the region (306) of virtual memory for other uses.

Cross-memory attachment is a cross-memory service provided by many operating systems to allow sharing of data among processes operating in different process memory address spaces. Many operating systems provide services for attaching a region of virtual memory to a process address space, such as, for example, the AIX™ kernel service named 'xmattach' which operates to attach such a region of virtual memory to a process memory address space and fill out a cross-memory descriptor that describes the attached region. That is, xmattach generates a cross-memory descriptor that describes a region of process address space so that other processes can do cross-memory attachments of that region. Lightweight cross-memory attachment may be carried out by a separate system call, such as, for example, a system call named 'lwattach,' for lightweight attachment. An exporting process (308) may make an attached region of memory available for lightweight cross-memory attachment by communicating the pertinent cross-memory descriptor to an importing process (318). The cross-memory descriptor may be communicating by the use of any method of inter-process communications, a pipe, a named stream, a traditional shared memory segment, another cross-memory attachment, mutually accessible memory storage on a file system, and so on, as will occur to those of skill in the art. When the importing process (318) has the cross-memory descriptor from the exporting process (308), the importing process can then request a lightweight cross-memory attachment (322) to its process memory (320) of the region (306) of virtual memory described by the cross-memory descriptor (326).

The operating system (154) also provides services to synchronize the content of the process memory segment attached to the region of virtual memory. AIX, for example, provides the kernel service named 'xmemin' and 'xmemout' to transfer data from process memory to virtual memory and from virtual memory to process memory. The operating system (154) also maintains a record of which regions of virtual memory are attached cross-memory to process memory and how many lightweight attachments exist for each such region. A region of virtual memory having cross-memory attachments to process memory cannot be freed for other uses until all lightweight attachments have been detached. The operating system (154) also provides services such as AIX's kernel service named 'xmdetach' for detaching cross-memory attachments from exporting processes. The operating system also provides a service for 'lightweight' detachments that may be named, for example, 'lwdetach,' that detaches lightweight cross-memory attachments (322) from the process memory (320) of importing processes (318). Such lightweight detachments are carried out by a separate operating system service from other more traditional detachments and are described as 'lightweight' because in many circumstances the lightweight detachment can be carried out with no need to incur the slow, burdensome processing costs of resetting all the SLBs in the system.

Figures 1A, 1B:
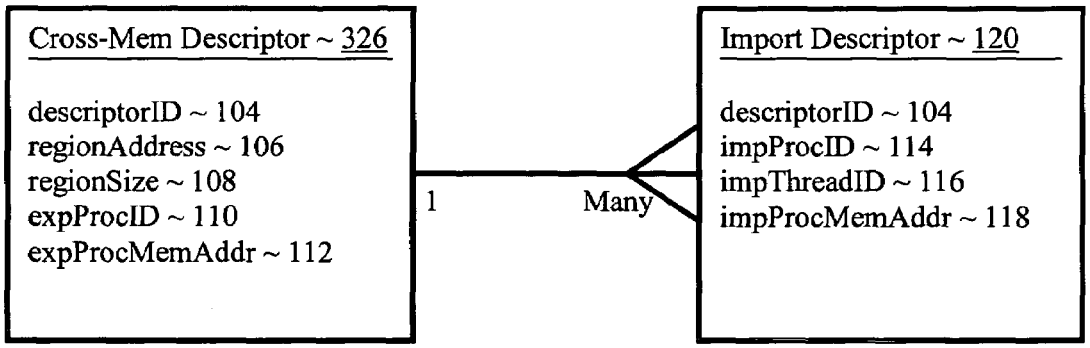
FIG. 1A sets forth an example of cross-memory descriptor including a descriptor identification field.
FIG. 1B illustrates the data structure that provides a one-to-many relationship between a data structure representing the cross-memory descriptor and a second data structure.

For further explanation of cross-memory descriptors, FIGS. 1A and 1B set forth block diagrams of data structures useful as cross-memory descriptors in systems for scaling address space utilization in a multi-threaded, multi-processor computer according to embodiments of the present invention. In the example of FIG. 1A, cross-memory descriptor (326) includes a descriptor identification field (104), a field (106) named 'regionAddress' for storing the address of a region or segment of virtual memory having a cross-memory attachment, a field (108) named 'regionSize' for storing the size of a region of virtual memory available for cross-memory attachments, a field (110) named 'expProcID' for storing an identifier for an exporting process, a field (112) named 'expProcMemAddr' for storing an address of a memory segment in a process memory space of an exporting process that is mapped to a segment of virtual memory, a field (114) named 'impProcID' for storing an identifier for an importing process, and a field (118) named 'impProcMemAddr' for storing an address of a memory segment in a process memory space of an importing process that is mapped to a segment of virtual memory.

Because multiple importing processes may effect cross-memory attachments to the region of virtual memory, the data structure illustrated in FIG. 1B advantageously provides a one-to-many relationship between a data structure (326) representing the cross-memory descriptor and a second data structure (120). The second data structure (120), labeled 'Import Descriptor,' is linked to the cross-memory descriptor with the descriptor identifier (104) acting as a foreign key. The Import Descriptor (120) aggregates the fields that describe a cross-memory attachment to a particular segment of process memory of an importing process: the field (114) named 'impProcID' for storing an identifier for an importing process and the field (118) named 'impProcMemAddr' for storing an address of a memory segment in a process memory space of an importing process that is mapped to a segment of virtual memory.

Both exemplary cross-memory descriptors (326, 120) in FIGS. 1A and 1B also contain a field (116) named 'impThreadID' for storing an identifier for an importing thread of an importing process. In traditional memory management in multi-threaded, multi-processor computer systems, all process memory is shared by all threads of a process. In this example of a system for scaling address space utilization in a multi-threaded, multi-processor computer according to embodiments of the present invention, however, the presence of a valid thread identifier in a field such as 'impThreadID' (116) is typically used to identify a lightweight cross-memory attachment as an attachment to a segment or region of process memory for the exclusive use of the identified thread. A Boolean flag could be used to indicate that a particular attachment is a lightweight attachment for the exclusive use of a thread, although a field for a thread identifier would still be useful. Other ways of indicating that a particular attachment is a lightweight attachment for the exclusive use of a thread and identifying the thread may occur to those of skill in the art, and all such ways are well within the scope of the present invention.

Further with reference to the example of FIG. 1: Segments (312, 322) of process memory that are cross-memory attached to regions of virtual memory are mapped to the corresponding regions or segments of virtual memory by entries in a global segment table (not shown) maintained by the operating system (154). Access to translations in the operating system's global segment table is made available to processes through system calls. Translating memory references through such system calls is slow. Faster mappings of segment addresses from process memory to virtual memory are implemented in Segment Lookaside Buffers ('SLBs') (406). SLBs provide fast hardware caching of recently used translations from the global segment map. SLBs are typically represented as associative registers, high-speed hardware, that map process memory segment addresses to corresponding segment addresses in virtual memory. An SLB may have the following organization, for example:

| Valid Flag | Proc_Seg_Addr | Virtual_Seg_Addr |
|---|---|---|

In this exemplary SLB, a bit set named Proc_Seg_Addr bears an address of a memory segment in a process memory space that is mapped to a segment of virtual memory whose address may be stored in the bit set named Virtual_Seg_Addr. Such addresses may be implemented, for example, as memory page numbers or page frame numbers—because offsets to exact memory addresses are not generally needed for memory segment mapping.

The Valid Flag is a bit whose value indicates whether the present mapping represented by Proc_Seg_Addr and Virtual_Seg_Addr is valid or stale. Mapping validity may alternatively be indicated by entering an invalid address in Proc_Seg Addr or Virtual_Seg_Addr and by other methods as will occur to those of skill in the art. In addition to bits for a Valid Flag and memory segment addresses, SLB may also have other bit, such as, for example, security control bits, dirty bits, and so on as will occur to those of skill in the art. In this specification generally, the fact that a translation in an SLB is invalid or stale is represented by resetting the Valid Flag for the translation in the SLB to '0,' and setting one or more Valid Flags of an SLB to zero is referred to in this specification as 'resetting' the SLB.

As mentioned above, process memory is traditionally shared among threads of a process. Systems for scaling address space utilization in a multi-threaded, multi-processor computer according to embodiments of the present invention, however, effect lightweight cross-memory attachments of a portion of process memory for the exclusive use of a thread and therefore typically advantageously provide a way to guard against too much process memory being occupied by such lightweight attachments. That is, systems for scaling address space utilization in a multi-threaded, multi-processor computer according to embodiments of the present invention typically allow an importing thread to register with the operating system for lightweight cross-memory attachments and, in the process of registering, specify to the operating system a maximum pool size for a pool (328) of process memory to be reserved for each thread of the importing process for use in lightweight attachments.

The operating system (154) maintains several data elements for management of a system for scaling address space utilization in a multi-threaded, multi-processor computer according to embodiments of the present invention, including, for example, a record of the maximum pool size (121) for a pool (328) of process memory to be reserved for each thread of an importing process for lightweight attachments. The maximum pool size (121), established when a process registers with the operating system for cross-memory attachments, is maintained in this example for each process. The operating system (154) also maintains a record of the actual pool size (122) for lightweight attachments for each thread that establishes any lightweight cross-memory attachment of virtual memory. The operating system (154) also maintains a 'cursor' (102), a data element that records the next available memory location for use in lightweight cross-memory attachments according to embodiments of the present invention, so that the range of memory between the cursor and the end of the pool is the quantity of pool memory available for use by a particular thread for lightweight cross-memory attachments according to embodiments of the present invention.

The operating system (154) also maintains a count (602) of lightweight cross-memory attachments for each region of virtual memory having such attachments. Because it is disadvantageous for an exporting process to detach a cross-memory attachment to exporting process memory from a region of virtual memory before all importing processes have also detached from that region, the count of lightweight cross-memory attachments for each such region is used to prevent premature detachment by an exporting process.

The operating system (154) also maintains records of the time (618) of last lightweight detachment from each region of virtual memory and the time (620) of last address space switch for each processor of the system. Even when all importing processes have lightweight detached a region of virtual memory, stale mappings to the detached region may remain in SLBs. As explained above, it is inefficient to reset all SLBs every time an exporting processes detaches a cross-memory attachment. Various processing events, including various kinds of interrupts, systems calls, and context switches, cause an address space switch for a processor that includes resetting the processor's SLB. If all importing processes have effected lightweight detachments from a region and all processors have experienced an address space switch since the last lightweight detachment, then it is safe for the exporting process to detach because no stale translations remain in any SLB. The operating system (154) compares the time (618) of last lightweight detachment from each region of virtual memory and the time (620) of last address space switch for each processor of the system to determine whether it is safe for an exporting process to detach a cross-memory attachment to a region of virtual memory.

Systems for address space utilization in a multi-threaded, multi-processor computer according to embodiments of the present invention are typically implemented as automated computing machinery, that is, as computer systems. For further explanation, therefore, FIG. 2 sets forth a block diagram of an exemplary computer system (134) operable according to various embodiments of the present invention for scaling address space utilization in a multi-threaded, multi-processor computer.

Figure 2:
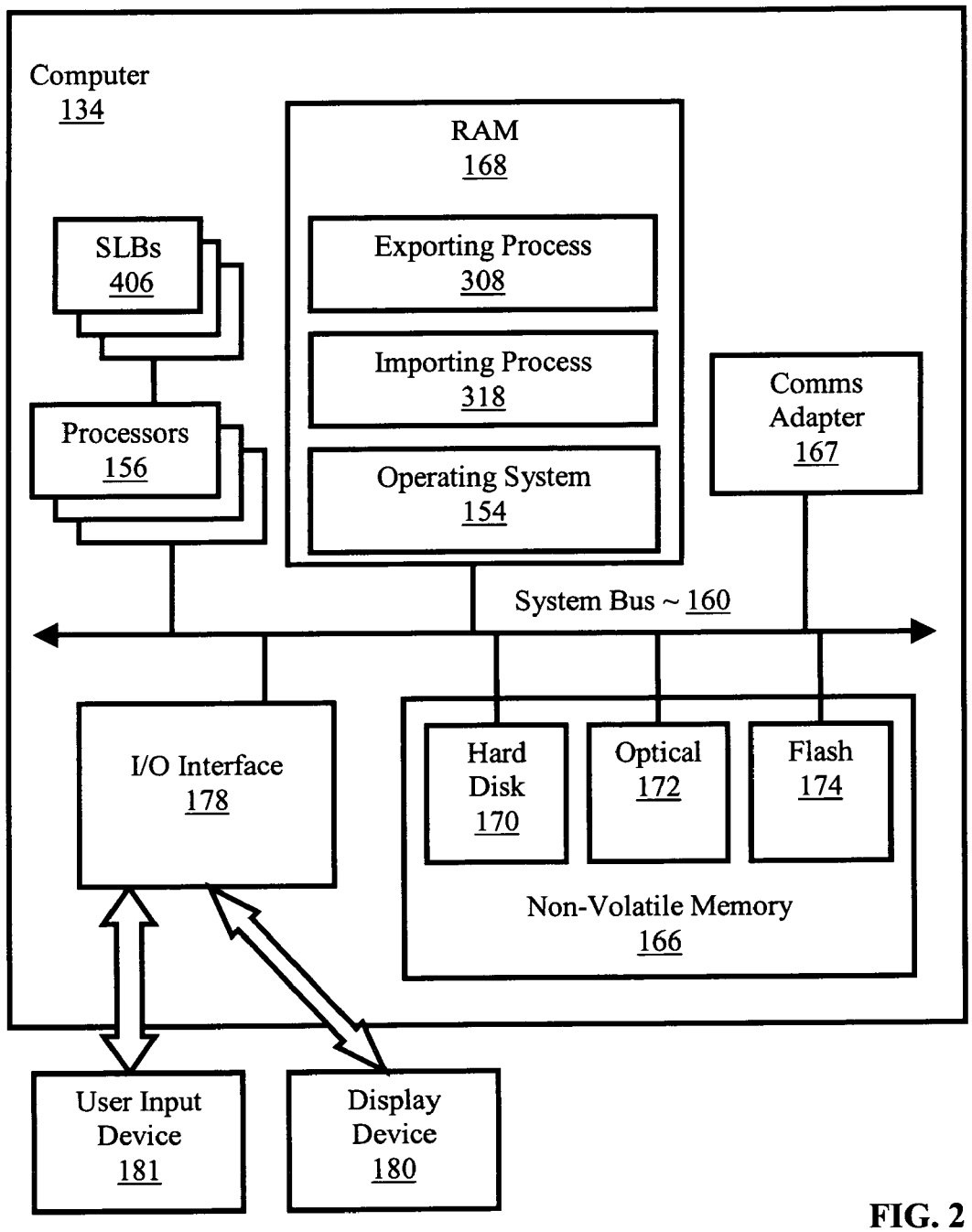
FIG. 2 sets forth a block diagram of an exemplary computer system for scaling address space utilization in a multi-threaded, multi-processor computer.

The computer (134) of FIG. 2 shows three computer processors (156). The number three is not a limitation of the invention, however, because computer systems according to embodiments of the present invention may include any number of processors. Moreover, the type of processor also is not a limitation of the present invention. Some processors may support execution of only one thread at a time. Other processors may support hardware multi-threading or 'simultaneous multi-threading' ('SMT'), hardware support for multiple independent threads on a processor at the same time, multiple registers sets for threads instead of just one, allowing multiple threads to issue multiple instructions during each cycle of a processor's execution. Methods for address space utilization in a multi-threaded, multi-processor computer according to embodiments of the present invention are capable of implementation on many kinds of processors as will occur to those of skill in the art.

The computer of FIG. 2 also includes random access memory (168) ("RAM"). Stored in RAM (168) are an exporting process (308) and an importing process (318). Such exporting processes and importing processes are programmed for scaling address space utilization in a multi-threaded, multi-processor computer according to embodiments of the present invention by attaching cross-memory to process memory of an exporting process a region of virtual memory; requesting, by an importing thread of an importing process having process memory, a lightweight cross-memory attachment of the region of virtual memory to the process memory of the importing process for exclusive use by the importing thread; and lightweight attaching cross-memory, by an operating system to the process memory of the importing process, the region of virtual memory for exclusive use by the importing thread. Exporting process (308) and importing process (318), alone or in conjunction with other threads and processes, may make up one or more application programs, including, for example, word processors, spreadsheets, database management systems, email clients, web servers, and any other application programs as will occur to those of skill in the art.

Also stored in RAM (168) is an operating system (154) programmed for scaling address space utilization in a multi-threaded, multi-processor computer by: attaching cross-memory to process memory of an exporting process a region of virtual memory; lightweight attaching cross-memory, by an operating system to the process memory of the importing process, the region of virtual memory for exclusive use by the importing thread; tracking process memory pools for lightweight cross-memory attachments, including maximum pool sizes, actual pool sizes, and pool cursors; maintaining counts of lightweight cross-memory attachments; tracking times of lightweight detachments from regions of virtual memory; tracking times of address space switches for processors; detaching regions of virtual memory from cross-memory attachments to process memory; and so on, according to embodiments of the present invention. Operating systems adaptable for use in systems for scaling address space utilization in a multi-threaded, multi-processor computer according to embodiments of the present invention include Unix™, Linux™, IBM's OS/390™, Microsoft NT™, and many others as will occur to those of skill in the art.

The computer of FIG. 2 includes non-volatile computer memory (166) coupled through a system bus (160) to processors (156) and to other components of the computer. Non-volatile memory (166) may be implemented as a hard disk drive (170), optical disk drive (172), electrically erasable programmable read-only memory space (so-called 'EEPROM' or 'Flash' memory) (174), RAM drives (not shown), or as any other kind of non-volatile computer memory as will occur to those of skill in the art.

The example computer (134) of FIG. 2 includes a communications adapter (167) implementing connections for data communications with other computers, clients, servers, or networks. Communications adapters implement the hardware level of connections for data communications between computers directly with one another and through networks. Examples of communications adapters include modems for wired dial-up connections, Ethernet (IEEE 802.3) adapters for wired LAN connections, and 802.11b adapters for wireless LAN connections.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181), such as keyboards and mice.

Figure 3:
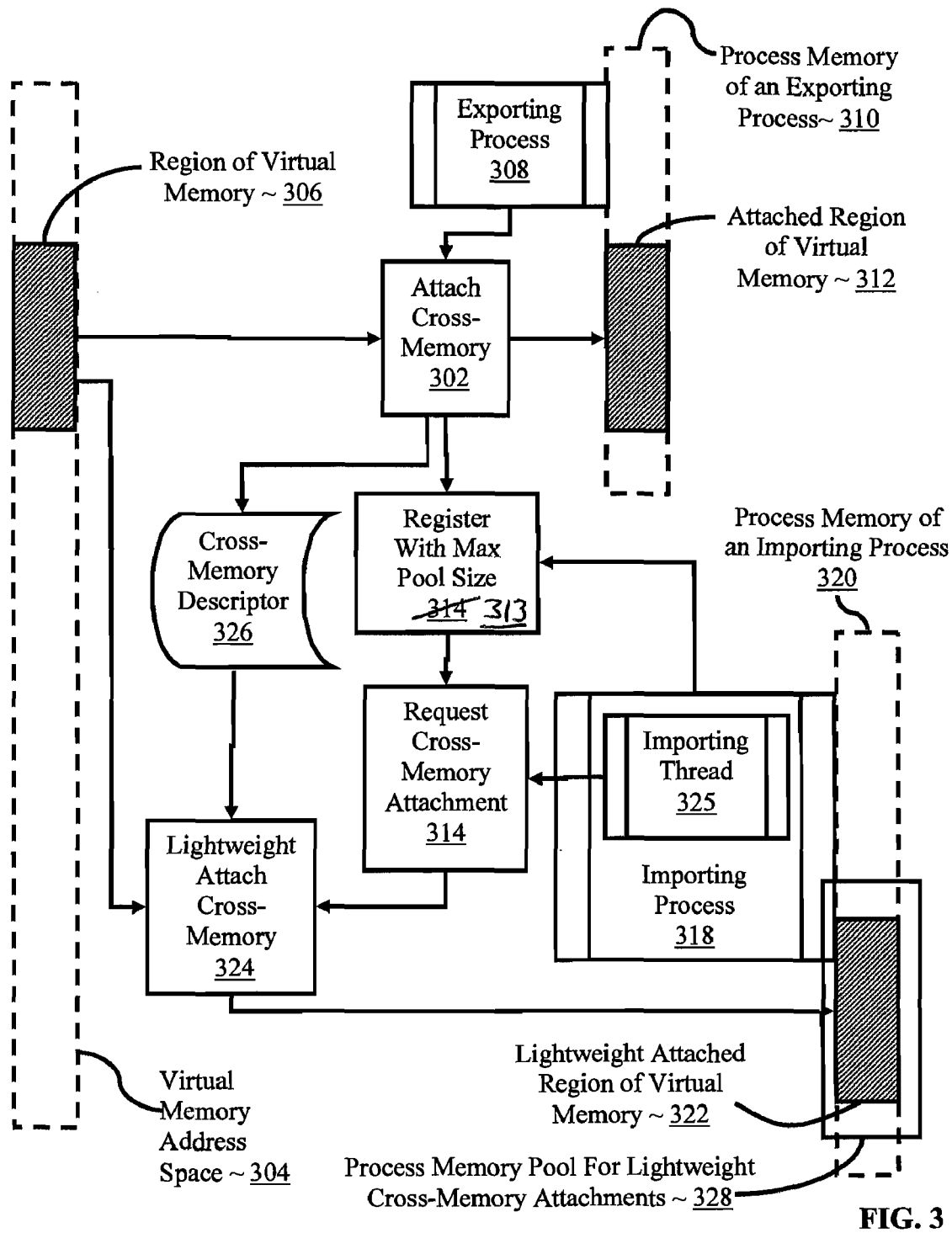
FIG. 3 sets forth a flow chart illustrating an exemplary method for scaling address space utilization in a multi-threaded, multi-processor computer.

For further explanation, FIG. 3 sets forth a flow chart illustrating an exemplary method for scaling address space utilization in a multi-threaded, multi-processor computer according to embodiments of the present invention that includes attaching (302) cross-memory to process memory (310) of an exporting process (308) a region (306) of virtual memory. In the method of FIG. 3, attaching (302) cross-memory a region (306) of virtual memory includes creating a cross-memory descriptor (326) that identifies the region of virtual memory.

The method of FIG. 3 also includes registering (313) by an importing process (318) with an operating system for lightweight cross-memory attachments of virtual memory to process memory of the importing process for exclusive use by threads of the requesting process. In typical systems for scaling address space utilization in a multi-threaded, multi-processor computer according to embodiments of the present invention, registering (313) with an operating system for lightweight cross-memory attachments of virtual memory to process memory of the importing process for exclusive use by threads of the requesting process includes advising the operating system of a maximum pool size of process memory of the importing process to be reserved for each thread of the importing process that requests such a lightweight cross-memory attachment. A process memory pool reserved for a thread of an importing process that requests a lightweight cross-memory attachment is shown at reference (328) on FIG. 3.

The method of FIG. 3 also includes an importing thread's (325) requesting (314) a lightweight cross-memory attachment (306) of the region of virtual memory. In the example of FIG. 3, the importing thread is a thread of an importing process (318) having process memory (320), and the request for a lightweight cross-memory attachment is a request for a lightweight cross-memory attachment of the region of virtual memory (306) to the process memory (320) of the importing process (318) for exclusive use by the importing thread (325). Only the importing thread (325) is shown on FIG. 3 as a thread of the importing process (318), although readers of skill in the art will understand that in fact the importing process (318) may have many threads. In requesting a lightweight cross-memory attachment, an importing thread typically provides to the operating system a copy of or a reference to the cross-memory descriptor describing the region of virtual memory to which an attachment is requested. The importing thread in turn acquires the cross-memory descriptor from an exporting thread by use of any method of inter-process communications, a pipe, a named stream, a traditional shared memory segment, another cross-memory attachment, mutually accessible memory storage on a file system, and so on, as will occur to those of skill in the art.

The method of FIG. 3 also includes lightweight attaching (324) cross-memory, by an operating system to the process memory (320) of the importing process, the region (306) of virtual memory for exclusive use by the importing thread. The operating system maintains a count of lightweight cross-memory attachments from the region of virtual memory identified by the cross-memory descriptor to importing processes, so that lightweight attaching cross-memory the region of virtual memory includes incrementing the count of lightweight attachments. In the method of FIG. 3, lightweight attaching (324) the region of virtual memory for the exclusive use of an importing thread also includes lightweight attaching the region of virtual memory from a pool (328) of process memory of the importing process reserved for lightweight cross-memory attachments for the importing thread.

Figure 4:
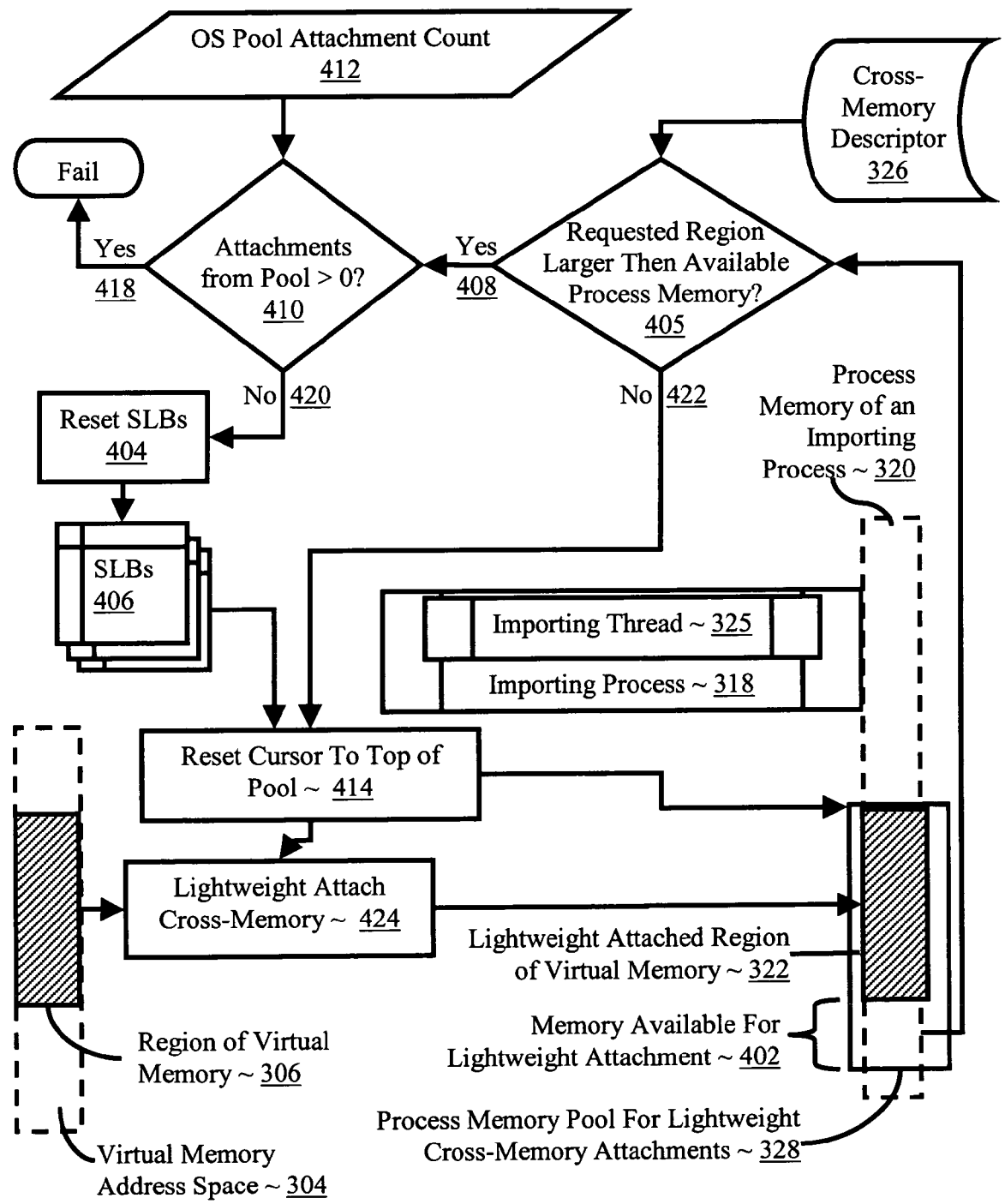
FIG. 4 sets forth a flow chart illustrating a method of lightweight attaching a region of virtual memory to the process memory of an importing process.

For further explanation, FIG. 4 sets forth a flow chart illustrating a method of lightweight attaching a region of virtual memory to the process memory of an importing process for the exclusive use of an importing thread that includes comparing (405) the requested region (306) of virtual memory and the quantity of process memory (402) available from a pool (328) of process memory of the importing process reserved for lightweight cross-memory attachments for the importing thread to determine whether the requested region (306) of virtual memory is larger (408) or smaller (422) than the quantity of process memory (402) available from the pool (328). In the example of FIG. 4, importing thread (325) has already requested (314 on FIG. 3) a lightweight cross-memory attachment of the region of virtual memory to the process memory of the importing process for exclusive use by the importing thread. In the method of FIG. 4, lightweight attaching the region of virtual memory to the process memory of the importing process includes lightweight attaching (424) the region (306) of virtual memory cross-memory to the process memory (320) of the importing process (318) without resetting segment lookaside buffers if the requested region (306) of virtual memory is smaller than (422) a quantity of process memory (402) available from a pool (328) of process memory of the importing process reserved for lightweight cross-memory attachments for the importing thread.

In the method of FIG. 4, lightweight attaching the region of virtual memory to the process memory of the importing process for the exclusive use of an importing thread includes lightweight attaching the region of virtual memory to the process memory of the importing process only after resetting (404) segment lookaside buffers (406) if the requested region of virtual memory is larger than (408) a quantity of process memory (402) available from a pool (328) of process memory of the importing process reserved for lightweight cross-memory attachments for the importing thread. In addition, in order to reduce the risk of memory conflicts, the method of FIG. 4 includes determining (410), by examining the operating system's count (412) of lightweight cross-memory attachments to the pool, whether there are any remaining lightweight attachments to the pool. If there are other lightweight attachments from the pool (418), the current lightweight attachment request fails. If there are no other lightweight attachments from the pool in question (420), processing continues by resetting (404) the SLBs (406) and resetting (414) the cursor to the top of the pool.

Figure 5:
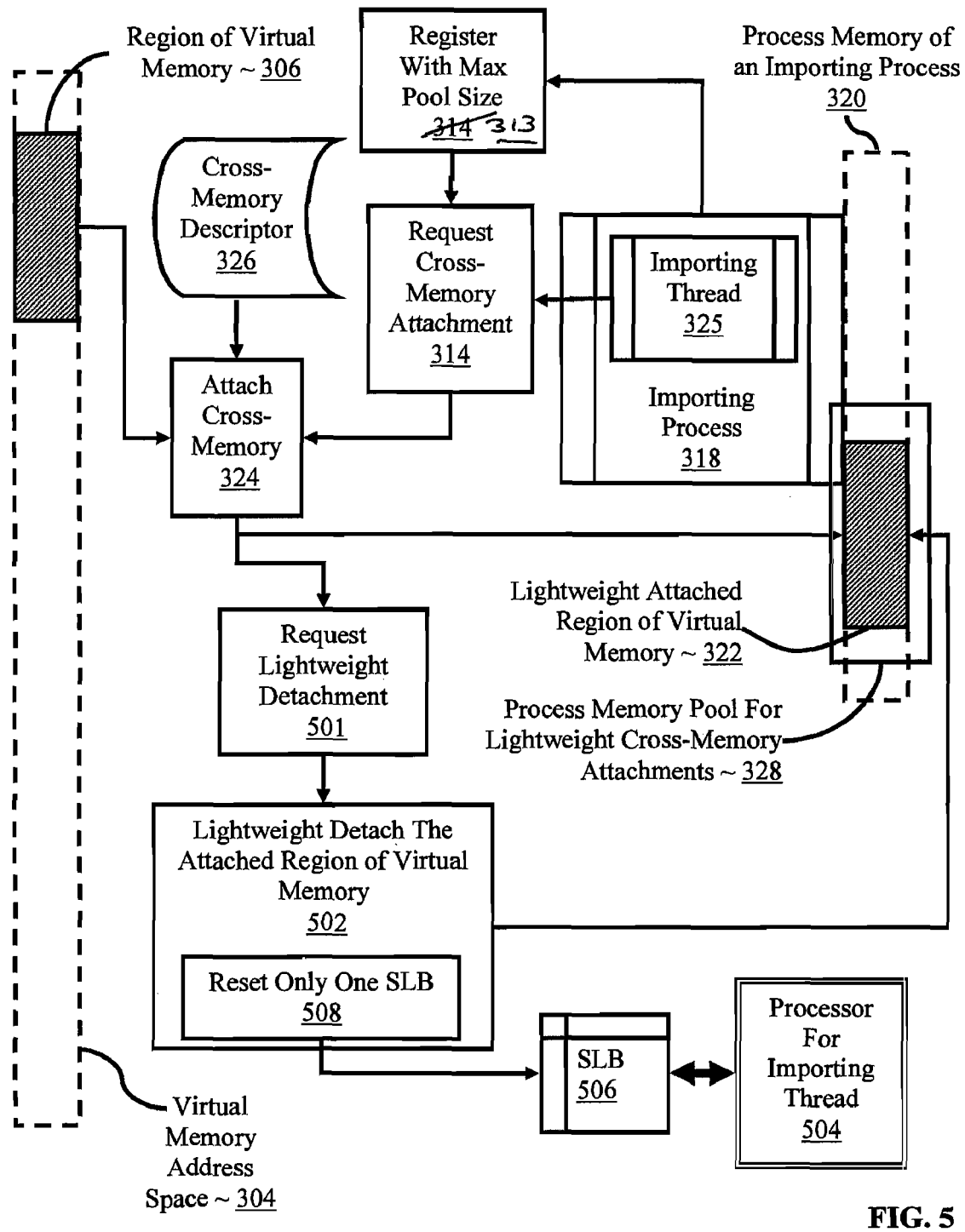
FIG. 5 sets forth a flow chart illustrating an exemplary method for scaling address space utilization in a multi-threaded, multi-processor computer.

For further explanation, FIG. 5 sets forth a flow chart illustrating an exemplary method for scaling address space utilization in a multi-threaded, multi-processor computer according to embodiments of the present invention that includes requesting (501), by the importing thread, lightweight detachment of the region (322) of virtual memory from the process memory (320) of the importing process (318). The method of FIG. 5 also includes detaching (502), by the operating system, the region (322) of virtual memory from the process memory (320) of the importing process (318), including resetting (508) only the segment lookaside buffer (506) of the processor (504) upon which the importing thread runs without resetting other segment lookaside buffers of other processors. This kind of detachment, where which only one segment lookaside buffer is reset, is referred to often in this specification as a 'lightweight detachment,' and the process of effecting a lightweight detachment is sometimes referred to in this specification as 'lightweight detaching.' Lightweight detaching (502), by the operating system, the region (322) of virtual memory typically also includes recording, by the operating system, the time (618 on FIG. 1) of the lightweight detaching of the region of virtual memory from the process memory of the importing process. In addition, lightweight detaching (502), by the operating system, the region (322) of virtual memory also typically includes decrementing a count (602 on FIG. 1) of lightweight cross-memory attachments from the region of virtual memory identified by the cross-memory descriptor.

Figure 6:
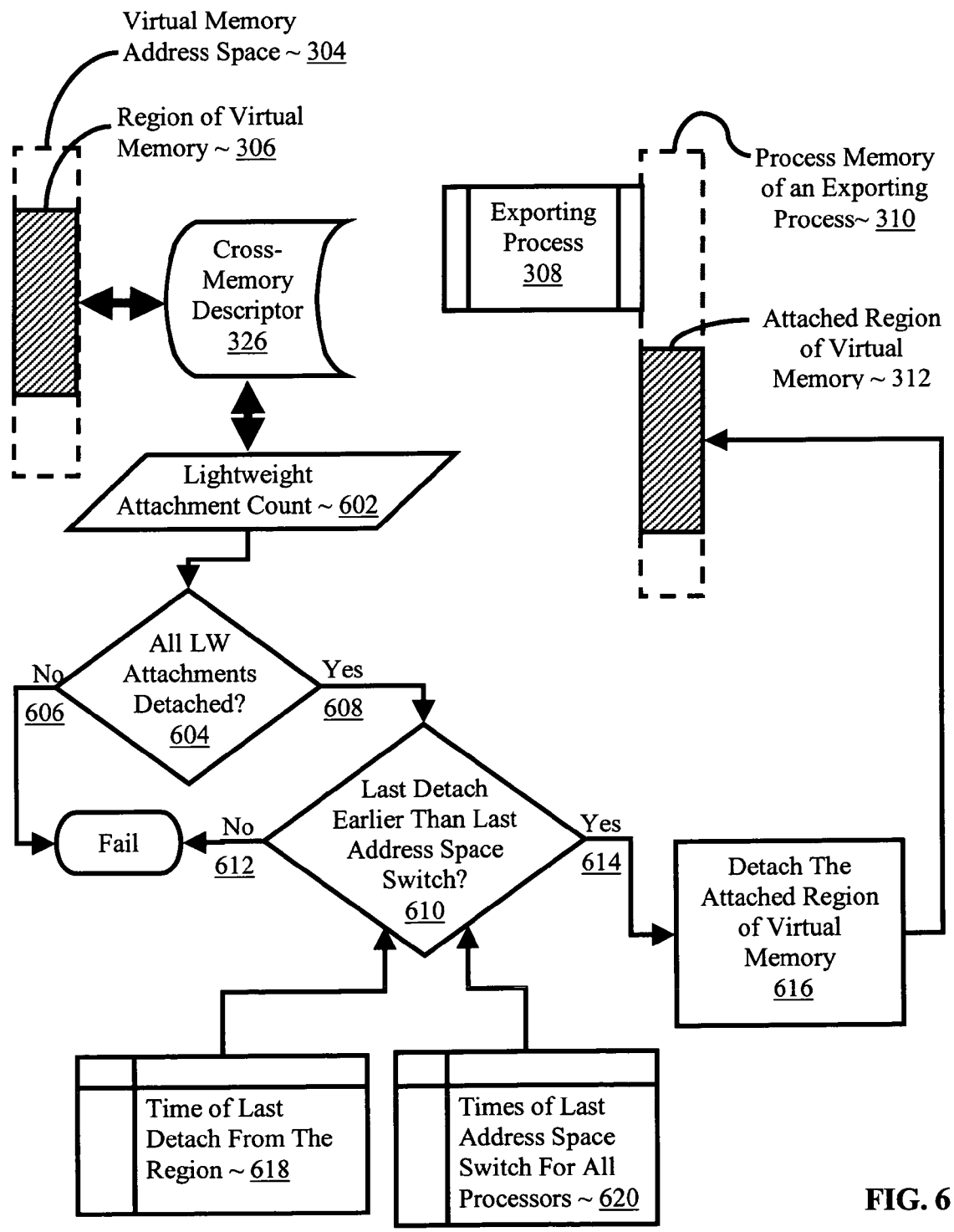
FIG. 6 sets forth a flow chart illustrating a method for detaching the cross-memory attachment to the process memory of the exporting process.

For further explanation, FIG. 6 sets forth a flow chart illustrating a method for detaching the cross-memory attachment to the process memory of the exporting process that includes determining (604) that all lightweight cross-memory attachments to the region (306) of virtual memory specified in the cross-memory descriptor (326) have been detached. In this example, determining (604) that all lightweight cross-memory attachments to the region (306) of virtual memory specified in the cross-memory descriptor (326) have been detached is carried out by examining the count (602) of lightweight attachments maintained by the operating system. If lightweight attachments to the region in question remain, in this example, the detachment request fails (606).

If all lightweight attachments are detached (608), the example of FIG. 6 continues by comparing (610) a time (618) of the last lightweight detachment from the region of virtual memory to the time (620) of the last address space switch on each processor in the computer. An address space switch for a processor resets the processor's SLB. If all SLBs have been reset since the last lightweight attachment, no stale translations can remain in any SLB. The method of FIG. 6 therefore also includes detaching (616) the region (312) of virtual memory from the process memory (310) of the exporting process (308) if the time (618) of the last lightweight detachment from the region of virtual memory is earlier than (614) the time (620) of the last address space switch on each processor in the computer. In the example of FIG. 6, the detachment request fails if the time (618) of the last lightweight detachment from the region of virtual memory is later than (612) the time (620) of the last address space switch on any processor in the computer.

For further explanation, FIG. 7 sets forth a flow chart illustrating a further method for detaching the cross-memory attachment to the process memory of the exporting process that advantageously does not fail if the time (618) of the last lightweight detachment from the region of virtual memory is later than (612) the time (620) of the last address space switch on any processor in the computer. More particularly, the method of FIG. 7 sets forth a flow chart illustrating a method for detaching the cross-memory attachment to the process memory of the exporting process that includes repeating (712) periodically for a predetermined period of time (710, 702, 704) the steps of comparing (610) a time (620) of the last lightweight detachment from the region of virtual memory to the time (618) of the last address space switch on each processor in the computer and detaching (616) the region (312) of virtual memory from the process memory (310) of the exporting process if the time (618) of the last lightweight detachment from the region of virtual memory is earlier than (614) the time (620) of the last address space switch on each processor in the computer.

Repeatedly comparing (610) a time (620) of the last lightweight detachment from the region of virtual memory to the time (618) of the last address space switch on each processor in the computer may be carried out, for example, by queuing a detachment request for the cross-memory attachment to the exporting process if, when the request for the detachment is received in the operating system, the time of the last detachment from the region of virtual memory is not earlier than the time of the last address space switch on each processor in the computer. A queue of such requests may then be periodically checked by comparing (702), through a separate process or thread running asynchronously, for each request in the queue, a time (620) of the last lightweight detachment from the virtual memory described in the pertinent cross-memory descriptor to the time (618) of the last address space switch on each processor in the computer.

Figure 7:
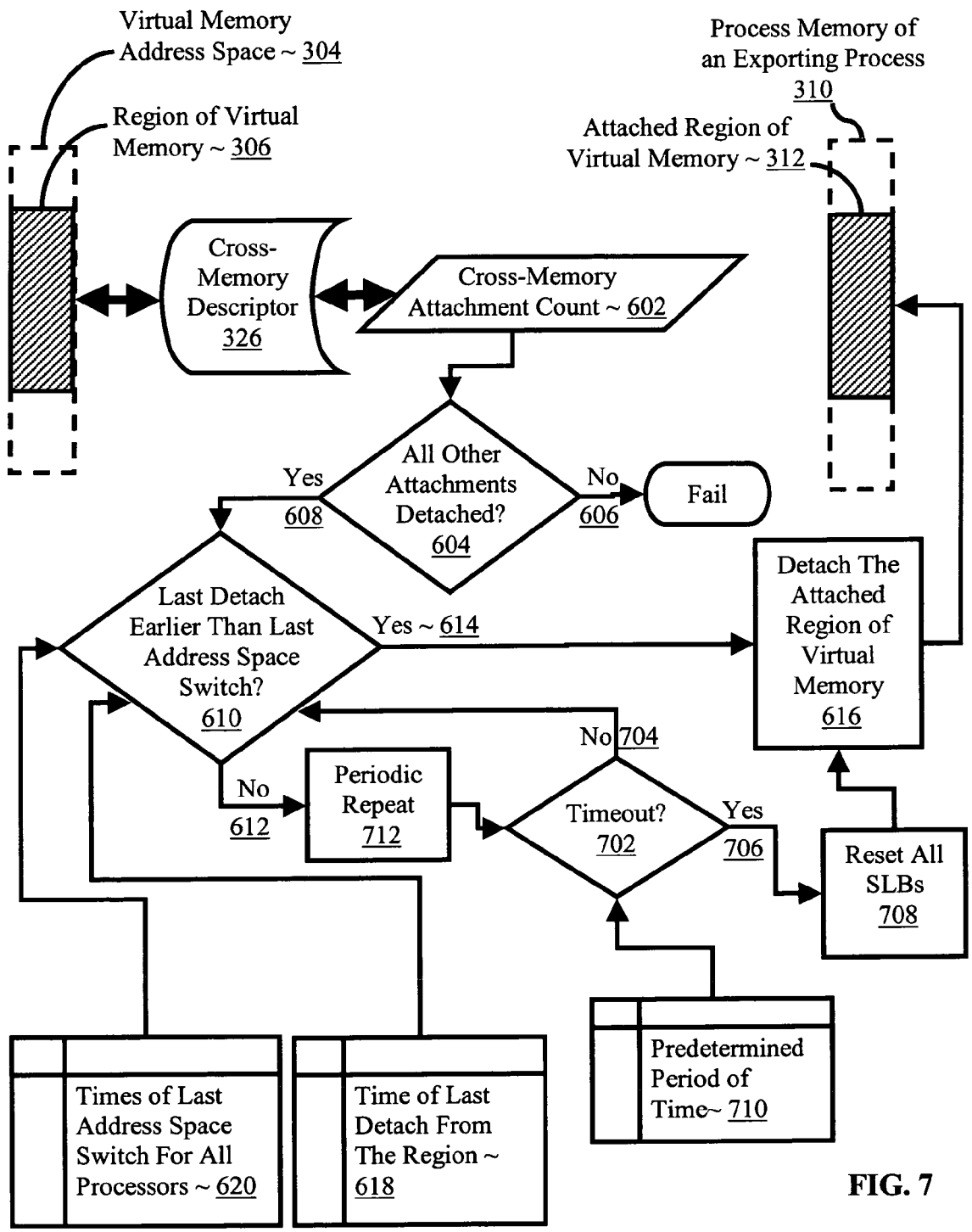
FIG. 7 sets forth a flow chart illustrating a further method for detaching the cross-memory attachment to the process memory of the exporting process.

In the example of FIG. 7, if the predetermined period of time expires before (706) the time (618) of the last lightweight detachment from the region of virtual memory is earlier (614) than the time (620) of the last address space switch on each processor in the computer, then the method of FIG. 7 includes resetting (708) all segment lookaside buffers of all processors in the computer and detaching (616) the region (312) of virtual memory from the process memory (310) of the exporting process. That is, the method of FIG. 7 will wait through the predetermined period for address space switches to reset all the SLBs, but it will not wait forever. Nevertheless, use of the method of FIG. 7 advantageously avoids the undesirable procedure of resetting all the SLBs in the circumstance when address space switches reset the SLBs before expiration of the predetermined period.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for scaling address space utilization in a multi-threaded, multi-processor computer, the method comprising:
    attaching, to process memory of an exporting process, a region of virtual memory specified in a cross-memory descriptor;
    requesting, by an importing thread of an importing process having process memory, attachment of the region of virtual memory for exclusive use by the importing thread;
    attaching, by an operating system to the process memory of the importing process, the region of virtual memory for exclusive use by the importing thread, thereby creating a lightweight attachment of the region of virtual memory;
    requesting, by the importing thread, lightweight detachment of the region of virtual memory from the process memory of the importing process; and
    detaching, by the operating system, the region of virtual memory from the process memory of the importing process, including resetting only the segment lookaside buffer of the processor upon which the importing thread runs without resetting other segment lookaside buffers of other processors, thereby effecting a lightweight detachment.

2. The method of claim 1 further comprising registering by the importing process with the operating system for lightweight attachment, including advising the operating system of a maximum pool size of process memory of the importing process to be reserved for each thread of the importing process that requests such a lightweight attachment.

3. The method of claim 1 wherein attaching the region of virtual memory for exclusive use by the importing thread further comprises attaching the region of virtual memory from a pool of process memory of the importing process reserved for lightweight attachments.

4. The method of claim 1 wherein attaching the region of virtual memory for exclusive use by the importing thread further comprises attaching the region of virtual memory without resetting segment lookaside buffers if the requested region of virtual memory is smaller than a quantity of process memory available from a pool of process memory of the importing process reserved for lightweight attachments.

5. The method of claim 1 wherein attaching the region of virtual memory for exclusive use by the importing thread further comprises attaching the region of virtual memory only after resetting segment lookaside buffers if the requested region of virtual memory is larger than a quantity of process memory available from a pool of process memory of the importing process reserved for lightweight attachments.

6. The method of claim 1 further comprising detaching the attachment to the process memory of the exporting process, including:
    determining that all lightweight attachments to the region of virtual memory have been detached;
    comparing a time of a last lightweight detachment from the region of virtual memory to the time of the last address space switch on each processor in the computer; and
    detaching the region of virtual memory from the process memory of the exporting process if the time of the last lightweight detachment from the region of virtual memory is earlier than the time of the last address space switch on each processor in the computer.

7. The method of claim 6 further comprising:
    repeating periodically for a predetermined period of time the steps of comparing a time of a last lightweight detachment from the region of virtual memory to the time of the last address space switch on each processor in the computer and detaching the region of virtual memory from the process memory of the exporting process if the time of the last lightweight detachment from the region of virtual memory is earlier than the time of the last address space switch on each processor in the computer;
    and if the predetermined period of time expires before the time of the last lightweight detachment from the region of virtual memory is earlier than the time of the last address space switch on each processor in the computer:
    resetting all segment lookaside buffers of all processors in the computer; and
    detaching the region of virtual memory from the process memory of the exporting process.

8. A system for scaling address space utilization in a multi-threaded, multi-processor computer, the system comprising:
    means for attaching, to process memory of an exporting process, a region of virtual memory specified in a cross-memory descriptor;
    means for requesting, by an importing thread of an importing process having process memory, attachment of the region of virtual memory for exclusive use by the importing thread;
    means for attaching, by an operating system to the process memory of the importing process, the region of virtual memory for exclusive use by the importing thread;
    means for requesting, by the importing thread, lightweight detachment of the region of virtual memory from the process memory of the importing process; and means for detaching, by the operating system, the region of virtual memory from the process memory of the importing process, including means for resetting only the segment lookaside buffer of the processor upon which the importing thread runs without resetting other segment lookaside buffers of other processors.

9. The system of claim 8 further comprising means for registering by the importing process with the operating system for lightweight attachment, including means for advising the operating system of a maximum pool size of process memory of the importing process to be reserved for each thread of the importing process that requests such a lightweight attachment.

10. The system of claim 8 wherein means for attaching the region of virtual memory for exclusive use by the importing thread further comprises means for attaching the region of virtual memory from a pool of process memory of the importing process reserved for lightweight attachments.

11. The system of claim 8 wherein means for attaching the region of virtual memory for exclusive use by the importing thread further comprises means for attaching the region of virtual memory without resetting segment lookaside buffers if the requested region of virtual memory is smaller than a quantity of process memory available from a pool of process memory of the importing process reserved for lightweight attachments.

12. The system of claim 8 wherein means for attaching the region of virtual memory for exclusive use by the importing thread further comprises means for attaching the region of virtual memory only after resetting segment lookaside buffers if the requested region of virtual memory is larger than a quantity of process memory available from a pool of process memory of the importing process reserved for lightweight attachments.

13. The system of claim 8 further comprising means for detaching the attachment to the process memory of the exporting process, including:

means for determining that all lightweight attachments to the region of virtual memory have been detached;

means for comparing a time of a last lightweight detachment from the region of virtual memory to the time of the last address space switch on each processor in the computer; and means for detaching the region of virtual memory from the process memory of the exporting process if the time of the last lightweight detachment from the region of virtual memory is earlier than the time of the last address space switch on each processor in the computer.

14. The system of claim 13 further comprising:

means for repeating periodically for a predetermined period of time the steps of comparing a time of a last lightweight detachment from the region of virtual memory to the time of the last address space switch on each processor in the computer and detaching the region of virtual memory from the process memory of the exporting process if the time of the last lightweight detachment from the region of virtual memory is earlier than the time of the last address space switch on each processor in the computer; and means for resetting all segment lookaside buffers of all processors in the computer and means for detaching the region of virtual memory from the process memory of the exporting process if the predetermined period of time expires before the time of the last lightweight detachment from the region of virtual memory is earlier than the time of the last address space switch on each processor in the computer.

15. A computer program product for scaling address space utilization in a multi-threaded, multi-processor computer, the computer program product comprising:

a recording medium;

means, recorded on the recording medium, for attaching, to process memory of an exporting process, a region of virtual memory specified in a cross-memory descriptor;

means, recorded on the recording medium, for requesting, by an importing thread of an importing process having process memory, attachment of the region of virtual memory for exclusive use by the importing thread;

means, recorded on the recording medium, for attaching, by an operating system to the process memory of the importing process, the region of virtual memory for exclusive use by the importing thread;

means, recorded on the recording medium, for requesting, by the importing thread, lightweight detachment of the region of virtual memory from the process memory of the importing process; and means, recorded on the recording medium, for detaching, by the operating system, the region of virtual memory from the process memory of the importing process, including means, recorded on the recording medium, for resetting only the segment lookaside buffer of the processor upon which the importing thread runs without resetting other segment lookaside buffers of other processors.

16. The computer program product of claim 15 further comprising means, recorded on the recording medium, for registering by the importing process with the operating system for lightweight attachment, including means, recorded on the recording medium, for advising the operating system of a maximum pool size of process memory of the importing process to be reserved for each thread of the importing process that requests such a lightweight attachment.

17. The computer program product of claim 15 wherein means, recorded on the recording medium, for attaching the region of virtual memory for exclusive use by the importing thread further comprises means, recorded on the recording medium, for attaching the region of virtual memory from a pool of process memory of the importing process reserved for lightweight attachments.

18. The computer program product of claim 15 wherein means, recorded on the recording medium, for attaching the region of virtual memory for exclusive use by the importing thread further comprises means, recorded on the recording medium, for attaching the region of virtual memory without resetting segment lookaside buffers if the requested region of virtual memory is smaller than a quantity of process memory available from a pool of process memory of the importing process reserved for lightweight attachments.

19. The computer program product of claim 15 wherein means, recorded on the recording medium, for attaching the region of virtual memory for exclusive use by the importing thread further comprises means, recorded on the recording medium, for attaching the region of virtual memory only after resetting segment lookaside buffers if the requested region of virtual memory is larger than a quantity of process memory available from a pool of process memory of the importing process reserved for lightweight attachments.

20. The computer program product of claim 15 further comprising means, recorded on the recording medium, for detaching the attachment to the process memory of the exporting process, including:

means, recorded on the recording medium, for determining that all lightweight attachments to the region of virtual memory have been detached;

means, recorded on the recording medium, for comparing a time of a last lightweight detachment from the region of virtual memory to the time of the last address space switch on each processor in the computer; and means, recorded on the recording medium, for detaching the region of virtual memory from the process memory of the exporting process if the time of the last lightweight detachment from the region of virtual memory is earlier than the time of the last address space switch on each processor in the computer.

21. The computer program product of claim 20 further comprising:

means, recorded on the recording medium, for repeating periodically for a predetermined period of time the steps of comparing a time of a last lightweight detachment from the region of virtual memory to the time of the last address space switch on each processor in the computer and detaching the region of virtual memory from the process memory of the exporting process if the time of the last lightweight detachment from the region of virtual memory is earlier than the time of the last address space switch on each processor in the computer; and means, recorded on the recording medium, for resetting all segment lookaside buffers of all processors in the computer and means, recorded on the recording medium, for detaching the region of virtual memory from the process memory of the exporting process if the predetermined period of time expires before the time of the last lightweight detachment from the region of virtual memory is earlier than the time of the last address space switch on each processor in the computer.

\* \* \* \* \*